United States Patent
Pyo et al.

(10) Patent No.: US 11,503,810 B2
(45) Date of Patent: Nov. 22, 2022

(54) PET DOG MUZZLE

(71) Applicants: Gui Joong Pyo, Goyang-si (KR); Sang Jun Kim, Seoul (KR); Seong Won Pyo, Goyang-si (KR); Su Yeon Kim, Seoul (KR)

(72) Inventors: Gui Joong Pyo, Goyang-si (KR); Sang Jun Kim, Seoul (KR); Seong Won Pyo, Goyang-si (KR); Su Yeon Kim, Seoul (KR)

( * ) Notice: Subject to any disclaimer, the term of this patent is extended or adjusted under 35 U.S.C. 154(b) by 184 days.

(21) Appl. No.: 16/961,921

(22) PCT Filed: Sep. 18, 2018

(86) PCT No.: PCT/KR2018/011006
§ 371 (c)(1),
(2) Date: Jul. 13, 2020

(87) PCT Pub. No.: WO2019/142998
PCT Pub. Date: Jul. 25, 2019

(65) Prior Publication Data
US 2020/0337270 A1    Oct. 29, 2020

(30) Foreign Application Priority Data

Jan. 17, 2018  (KR) .......................... 10-2018-0006002

(51) Int. Cl.
*A01K 25/00*   (2006.01)
(52) U.S. Cl.
CPC .................................... *A01K 25/00* (2013.01)
(58) Field of Classification Search
CPC ..................................................... A01K 25/00
See application file for complete search history.

(56) References Cited

U.S. PATENT DOCUMENTS

| | | | | |
|---|---|---|---|---|
| 672,329 | A * | 4/1901 | McManus | A01K 25/00 119/831 |
| 1,082,372 | A * | 12/1913 | Thompson | A01K 25/00 119/831 |
| 1,474,303 | A * | 11/1923 | Veres | A01K 25/00 119/831 |
| 5,218,929 | A * | 6/1993 | Michunovich | A01K 25/00 119/832 |

(Continued)

FOREIGN PATENT DOCUMENTS

| | | | | |
|---|---|---|---|---|
| GB | 191229230 A | * | 1/1914 | ............ A01K 25/00 |
| KR | 10-2015-0103819 A | | 9/2015 | |
| KR | 10-2016-0131545 A | | 11/2016 | |

OTHER PUBLICATIONS

International Search Report in International Application No. PCT/KR2018/011006, dated Jan. 24, 2019, 2pages.

*Primary Examiner* — Monica L Perry
*Assistant Examiner* — Brittany A Lowery
(74) *Attorney, Agent, or Firm* — Park, Kim & Suh, LLC

(57) ABSTRACT

The present invention relates to a pet dog muzzle and, more specifically, to a pet dog muzzle comprising: a frame to be positioned between the upper jaw portion and the lower jaw portion of a pet dog; a screener coupled to the lower portion of a frame so as to surround the lower jaw portion of the pet dog; and a fixing band coupled to the rear portion of the frame, whereby the muzzle can minimize discomfort of the pet dog to reduce resistance thereof, and thus can be easily worn.

14 Claims, 11 Drawing Sheets

(56) References Cited

U.S. PATENT DOCUMENTS

| | | | |
|---|---|---|---|
| 5,732,415 A | 3/1998 | Boyd | |
| 2008/0264350 A1* | 10/2008 | Frevola | A01K 25/00 119/831 |
| 2010/0175636 A1* | 7/2010 | Slank | A01K 25/00 119/831 |
| 2016/0235038 A1* | 8/2016 | Sinko | A01K 27/003 |

* cited by examiner (A)

(B)

(A)

(B)

PET DOG MUZZLE

CROSS-REFERENCE TO RELATED APPLICATIONS

This application is the National Stage filing under 35 U.S.C. 371 of International Application No. PCT/KR2018/011006, filed on Sep. 18, 2018, which claims the benefit of Korean Patent Application No. 10-2018-0006002, filed on Jan. 17, 2018, the contents of which are all hereby incorporated by reference herein in their entirety.

TECHNICAL FIELD

The present invention relates to a muzzle, and more particularly, to a pet dog muzzle, in which parts other than a nose bridge are prevented from touching a nose portion or mouth portion of a pet to minimize discomfort of the pet, and an upper portion of a frame is formed as an open surface to significantly reduce resistance of the pet against a muzzle.

BACKGROUND ART

In Korea, the number of human families for pets have reaches 10 million, the population of caring companion animals at home is gradually increasing, and the number of animals residing together reaches almost 3.5 million. In modern society, the companion animals have become friends and family living together as members of a household beyond a mere animal.

A pet dog among these companion animals has few risk factors, such as barking or biting, with respect to friendly family members, however, may express aggression to strangers according to a type, trained status, life habit, or the like of the pet dog.

In particular, when the pet dog is a breed having a large body and a tough-looking face, a person who hates or is scared of dogs may be vigilant, and there is always a risk that a child may be bitten because the child has a body smaller than the pet dog. Recently, as accidents that pet dogs attack people frequently occur, a bill has been prepared to let the pet dog mandatorily wears a muzzle.

FIG. 1 is a view showing a conventional pet dog muzzle disclosed in Korean Unexamined Patent Publication No. 10-2016-0131545 (Nov. 16, 2016).

As shown in FIG. 1, the conventional pet dog muzzle includes an upper cover portion 10 formed to surround an upper part of a snout 1 of a pet dog, a lower cover portion 20 integrally connected to the upper cover portion and formed to surround a bottom of the snout of the pet dog, a snout insertion hole 30 into which the snout of the pet dog is inserted, a nose exposure hole 40 for allowing a nose 2 part of the pet dog to be exposed to the outside, and a fixing band 50 having both ends connected to the lower cover portion to surround a rear side of a neck of the pet dog.

However, since the conventional pet dog muzzle is configured that the upper cover portion and the lower cover portion cover both the upper and lower parts of the snout of the pet dog, the pet dog feels uncomfortable and unwillingly wears the pet dog muzzle, so a lot of training and efforts are required to wear the pet dog muzzle.

Further, according to the conventional pet dog muzzle, since the upper and lower parts of the snout of the pet dog are blocked by a predetermined structure, thereby becoming a hindrance factor to a vision of the pet dog, and thus the pet dog feels resistance.

The above descriptions as the background art are only for further understanding of the background of the present invention, and it shall not be construed as acknowledging that they correspond to the prior art already known to a person having ordinary skill in the art.

DETAILED DESCRIPTION OF THE INVENTION

Technical Problem

In order to solve the above conventional problems in the art, an object of the present invention is to provide a pet dog muzzle including a frame, a nose bridge, a screener, and the like, and configured to maintain a predetermined distance from a nose and a snout of a pet dog, thereby minimizing discomfort of the pet dog.

In addition, another object of the present invention is to provide a pet dog muzzle, in which an upper portion of the frame is completely opened, so that a vision of a pet dog is ensured smoothly, and resistance of the pet dog is significantly reduced compared to the conventional muzzle having a closed upper portion of the frame.

Technical problems to be solved by the present invention are not limited to the above-mentioned technical problems, and a person having ordinary skill in the art may apparently understand other technical problems not mentioned herein, based on the descriptions according to the present invention.

Technical Solution

In order to achieve the above objects, the present invention provides a pet dog muzzle including: a frame disposed between an upper jaw portion and a lower jaw portion of a pet dog; a screener coupled to a lower portion of the frame to surround the lower jaw portion of the pet dog; and a fixing band coupled to a rear portion of the frame, wherein the upper portion of the upper jaw portion remains open, and only the lower jaw portion is surrounded, thereby ensuring a vision of the pet dog and reducing resistance.

The upper portion of the frame may be formed as an opened surface through a hollow so that the upper jaw portion of the pet dog is not surrounded, and the lower portion of the frame may be formed as a closed surface that surrounds the lower jaw portion of the pet dog by using the screener.

A nose bridge coupled to cross the frame through a holding portion formed in a middle portion of the frame may be further included.

The holding portion may elongate in a front-rear direction the frame such that the nose bridge is coupled to a predetermined position in the front-rear direction.

The holding portion may include a slider slidable in the front-rear direction of the frame; and a fixture rotatably mounted to the slider to fix a position of the slider.

The holding portion may be formed therein with a plurality of fixing grooves arranged to face each other at both sides in the middle portion of the frame.

The holding portion may be formed to have a protrusion shape on one side of an inner surface of the frame.

The nose bridge may include a mounting portion extending between both ends of the nose bridge, and the both ends may be formed with perforated holes to be fixed to the holding portion by male-female coupling.

The mounting portion may extend to form a curved shape between the both ends.

In the frame, an area adjacent to the nose of the pet dog may protrude outward.

The mounting portion may extend to include a straight shape between the both ends, and an imaginary line connecting the perforated holes formed at the both ends may be inconsistent with the mounting portion including the straight shape.

A plurality of nose bridge auxiliary holes may be formed in a front portion of the frame.

A pair of decorative holes may be formed in a rear portion of the frame so as to face each other.

A length adjusting portion may be formed at an end of the rear portion of the frame such that a fixing band is inserted from one side and passes through an opposite side around a partition.

The fixing band may be divided into a lower band disposed on a lower part of a neck of the pet dog and an upper band disposed on a rear part of the back of the pet dog around the length adjusting portion, and the lower band and the upper band may be fixed at predetermined lengths by the length adjusting portion.

A buffer formed of a rubber containing elastomer or a fiber may be further provided at an inner part in the rear portion of the frame to come into contact with a body of the pet dog.

The screener may be further formed with a vent, a periphery or edge of the vent or the frame may be formed to be relatively thick compared to thicknesses of other areas and processed to be rounded, so that a skin including a tongue or nose of the pet dog is prevented from being injured even when coming into contact with the periphery or edge.

The frame and the screener may be detachably coupled to each other.

Advantageous Effects of the Invention

According to the present invention having the above configuration, parts other than the nose bridge are prevented from coming into contact with the snout and the nose of the pet dog, thereby minimizing discomfort of the pet dog, so that the pet dog can easily wear the muzzle.

In addition, according to the present invention, the upper portion of the frame is open without surrounding the upper jaw portion of the pet dog, so that a vision of the pet dog can be maximally ensured, and resistance of the pet dog can be significantly reduced.

In addition, according to the present invention, the holding portion elongates in the front-rear direction of the frame to adjust a position of the nose bridge freely, so that the muzzle can be worn on pet dogs having various breeds and sizes without diversifying a size of the frame.

In addition, according to the present invention, the nose bridge is mounted on the holding portion, in which at least a part of the mounting portion is configured to have a curved or straight shape, such that the imaginary line connecting the perforated holes formed at both ends of the nose bridge is inconsistent with the mounting portion of the nose bridge, and thus the nose bridge can be flexibly inversed according to a length of the nose of the pet dog.

In addition, according to the present invention, the nose bridge auxiliary holes may be formed in the front portion of the frame, so that even the dog having a short snout can easily wear, and the decorative holes are formed in the rear portion of the frame, so that various fashion items such as decorative headbands can be mounted thereon.

In addition, according to the present invention, the length adjusting portion is formed at the end of the rear portion of the frame, so that a length of the lower band can be adjusted and fixed, and the upper band can be easily adjusted without an additional buckle.

In addition, according to the present invention, the lower band surrounds the lower part of the neck of the pet dog, and the upper band surrounds the rear part of the neck of the pet dog, so that one fixing band can have the same effect as wearing two bands, and thus the muzzle can be firmly installed on the pet dog.

In addition, according to the present invention, even rear head part is surrounded by the frame rather than a strap, an overall length of the strap surrounding the rear head becomes shorter compared to the conventional invention. Accordingly, a movement distance of the strap also becomes shorter, so that the muzzle can be prevented from slipping off without excessively tightening the strap.

In addition, according to the present invention, the upper portion of the muzzle is open and the closed area is also configured not to come into contact with the snout or nose of the pet dog, so that the upper and lower jaw portions can move more freely. Accordingly, barking or feeding is relatively convenient compared to the conventional muzzle, and thus the stress on the pet dog can be significantly prevented despite the wearing of the muzzle.

In addition, according to the present invention, the area in the frame adjacent to the nose of the pet dog is configured to protrude outward based on the length of the nose in a face contour of the pet dog, so that the nose, which is especially sensitive among body parts of the pet dog, can be prevented from irritating as possible.

In addition, according to the present invention, edges of the frame or the vent of the screener are finished to be round rather than sharp, and the corresponding part is configured to be thicker than an overall thickness of the muzzle, so that the nose or tongue of the pet dog can be prevented from being injured upon contact.

In addition, according to the present invention, the buffer is further provided inside the rear portion of the frame using a rubber containing elastomer or a fiber, so that a skin of the pet dog coming into direct contact with the inside of the rear portion can be prevented from being damaged, and the excellent wearability can be provided.

In addition, according to the present invention, the screener and the frame are detachably installed, so that it can be economically advantageous, because only the corresponding part can be replaceable when a replacement is necessary due to reasons such as damages.

In addition, according to the present invention, the screener is transparent, so that the owner can immediately check a condition of the pet dog even while the muzzle is worn. Accordingly, a behavior, discomfort, and stress prior to attack of the pet dog can be easily recognized, so that an unexpected behavior of the pet dog can be prevent.

Further, according to the present invention, the rear portion of the frame is formed of a soft material, end portion is adjusted according to the size of a head of the pet dog and comes into close contact with the head, so that the wearing stability can be improved.

BEST MODE

Figure 1:
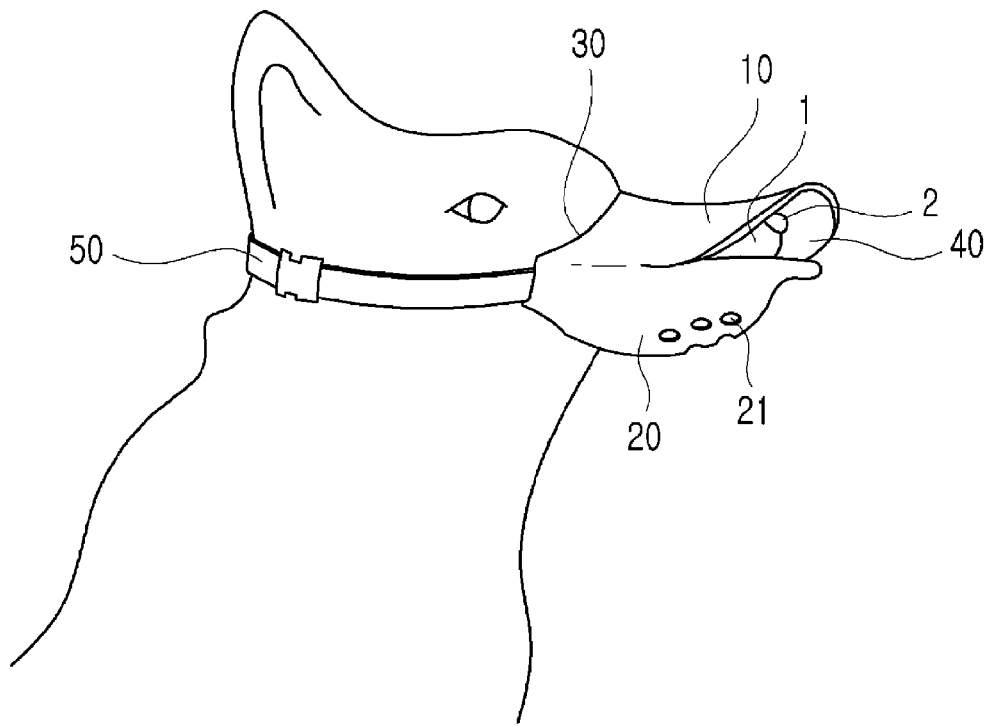
FIG. 1 is a view showing a conventional pet dog muzzle disclosed in Korean Unexamined Patent Publication No. 10-2016-0131545 (Nov. 16, 2016).

Hereinafter, the present invention will be described in detail with reference to the accompanying drawings so that a person having ordinary skill in the art may easily carry out the present invention. However, the invention may be embodied in various different forms and is not limited to the embodiments described herein.

Parts irrelevant to the description are omitted to clearly describe the present invention, and same reference numerals are used for the same or similar elements throughout the specification.

In addition, the terms and words used in the specification and claims of the present invention should not be construed as limited to a conventional or lexical meaning, and should be construed as the meanings and concepts consistent with the technical idea of the present invention based on the principle that "an inventor may define the concept of the term properly in order to describe the invention in the best way".

Figure 2:
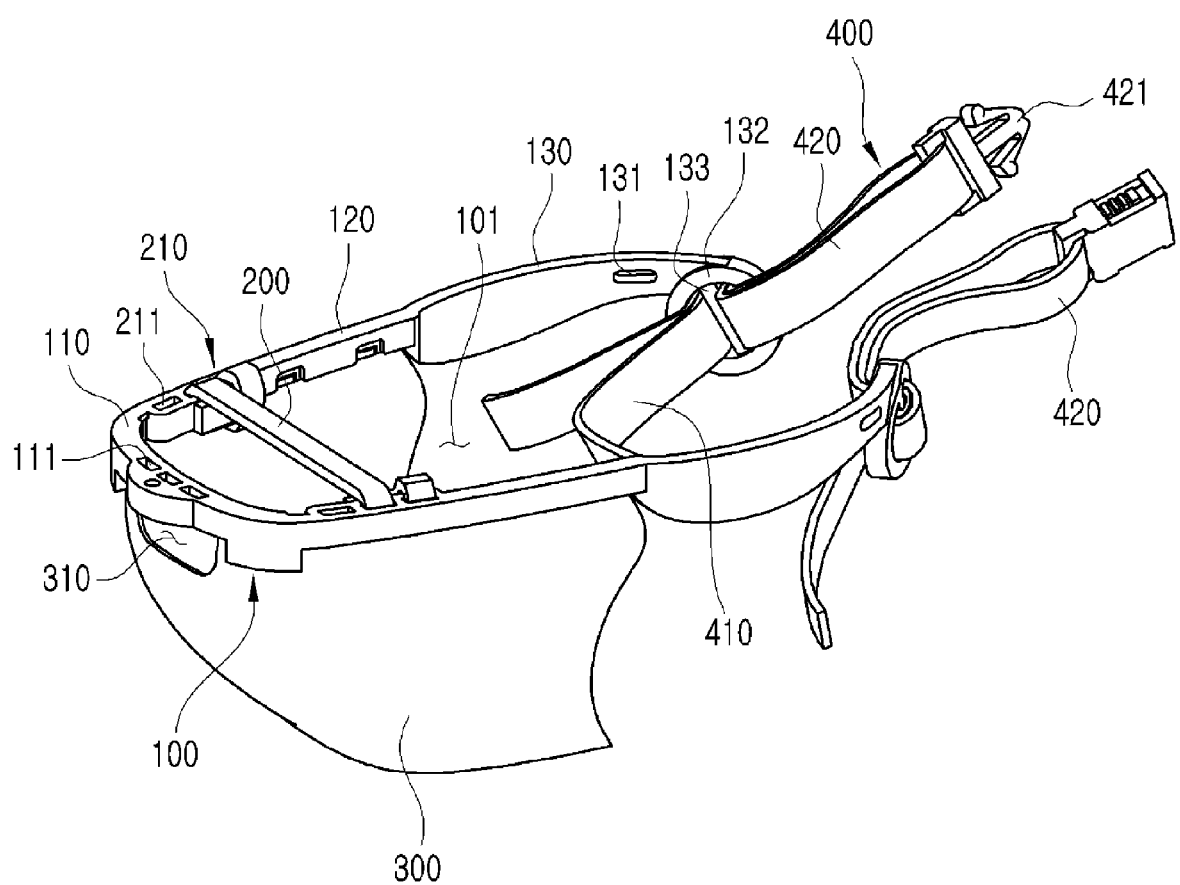
FIG. 2 is a perspective view showing a pet dog muzzle according to one embodiment of the present invention.

FIG. 2 is a perspective view showing a pet dog muzzle according to one embodiment of the present invention.

As shown in the drawing, the pet dog muzzle according to the present invention includes: a frame 100 disposed between an upper jaw portion and a lower jaw portion of a pet dog; a screener 300 coupled to a lower portion of the frame; and a fixing band 400 coupled to a rear portion of the frame. A nose bridge 200 disposed to across the frame may be further included. The nose bridge 200 may be selectively applied subject to a strong fixing force of the fixing band 400 coupled to the rear portion of the frame. In other words, the nose bridge 200 may stress the pet dog even slightly. Accordingly, the nose bridge 200 may or may not be employed.

As shown in FIG. 1, the conventional pet dog muzzle covers an entire snout of the pet dog, so the upper and lower portions of the muzzle are configured to have a high probability of coming into contact with the snout of the pet dog at the top and bottom. On the contrary, the pet dog muzzle according to the present invention may maintain a predetermined distance from the snout of the pet dog. Further, since the upper portion of the frame 100 is formed as an open shape, there is a difference in that an interference is rare with respect to an upper portion of the snout, that is, an upper jaw portion of the pet dog.

In other words, the pet dog muzzle according to the present invention may surround only the lower jaw portion of the pet dog through the screener 300, and all fixations are conducted at a rear side of the frame 100 except for the nose bridge 200, so that resistance of the pet dog may be minimized.

Specifically, configurations of the pet dog muzzle according to the present invention will be described as follows.

Figure 3:
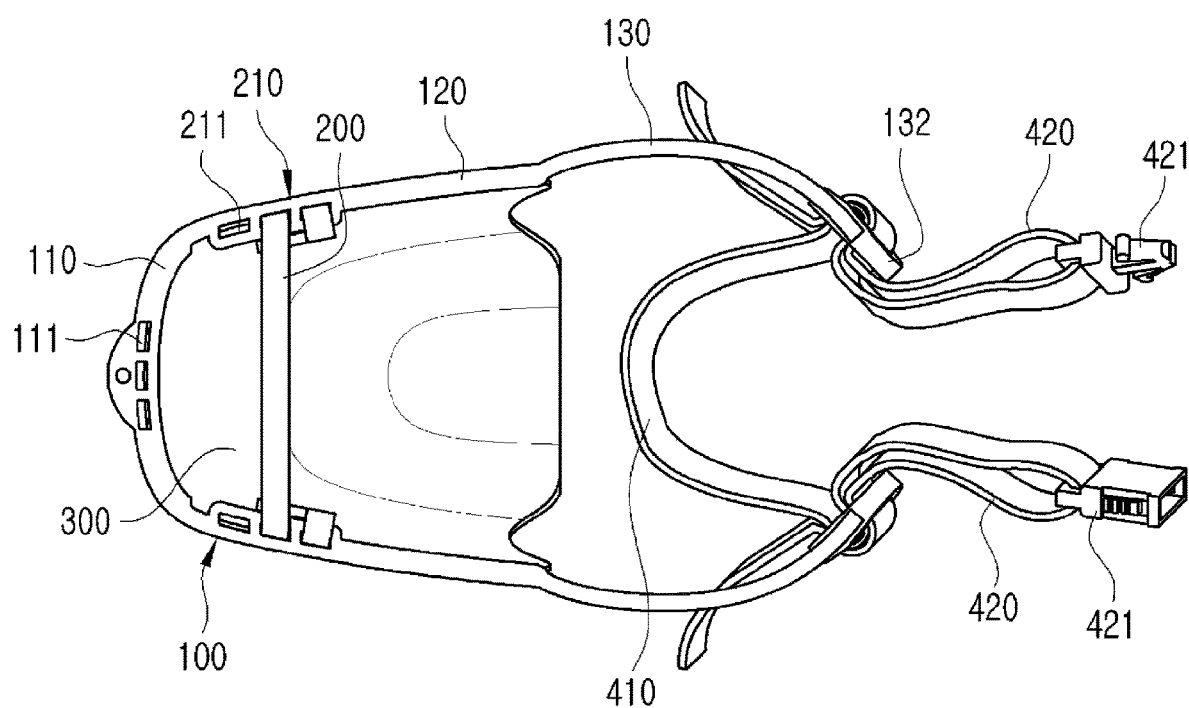
FIG. 3 is a plan view showing the pet dog muzzle according to one embodiment of the present invention.
Figure 4:
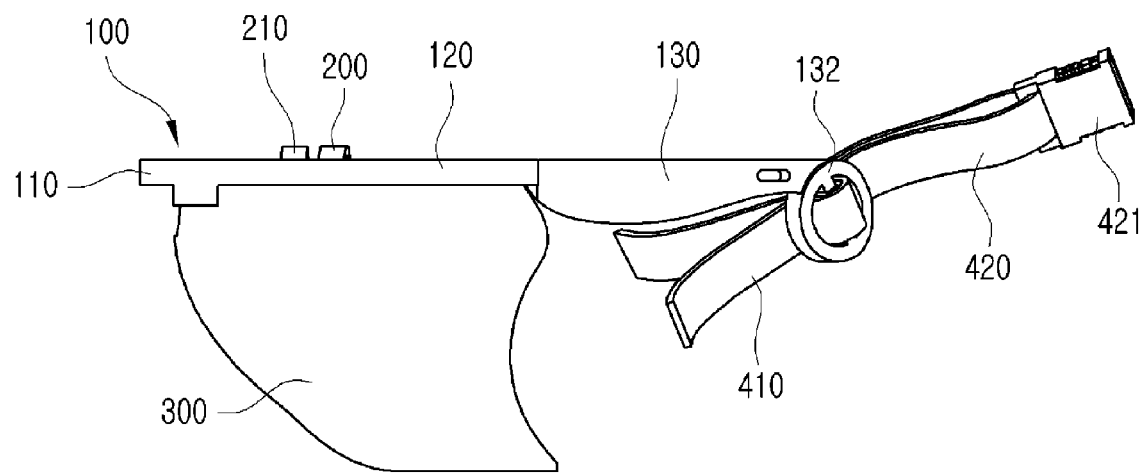
FIG. 4 is a side view showing the pet dog muzzle according to one embodiment of the present invention.
Figure 5:
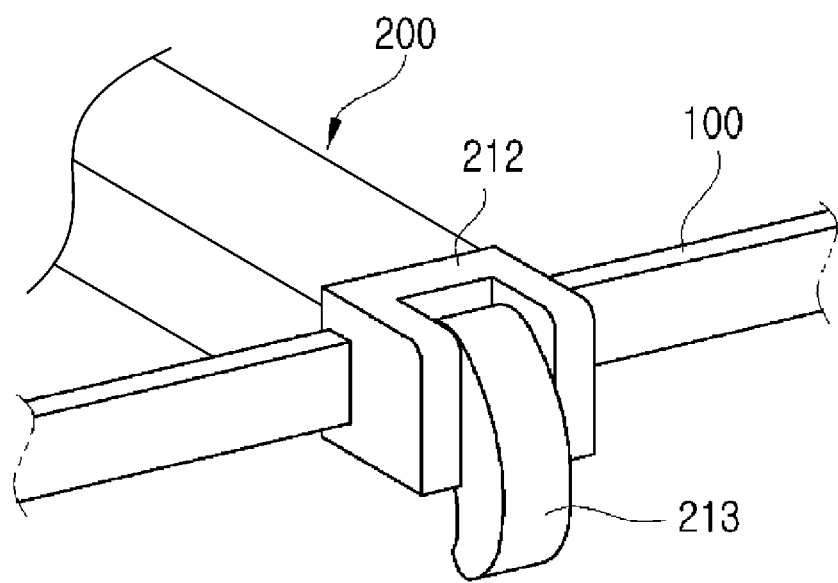
FIG. 5 is a view showing a holding portion according to another embodiment of the present invention.

FIG. 3 is a plan view showing the pet dog muzzle according to one embodiment of the present invention. FIG. 4 is a side view showing the pet dog muzzle according to one embodiment of the present invention. FIG. 5 is a view showing a holding portion according to another embodiment of the present invention.

As shown in the drawing, the frame 100 has a 'U'-shape as a whole, and is divided into a front portion 110 arranged in a nose portion of the pet dog, a middle portion 120 passing a side of the snout of the pet dog, and a rear portion 130 arranged behind a head if the pet dog. The frame 100 is formed of a flexible and elastic material as a whole.

However, in order to further reinforce the durability of the frame 100, the frame 100 may be formed of metal, and may be formed of a synthetic resin frame embedded with a metal body. Various materials may be selectively applied to ensure the durability of the frame 100.

An end width of the rear portion 130 of the frame 100 may be formed to be relatively narrow or at least similar to the middle portion 120 and the front portion 110 so as to be supported by the head portion of the pet dog. A central part of the rear portion 130 may be formed in an arc shape having a relatively wide width compared to the middle portion 120 and the front portion 110 so as to gently surround the head portion of the pet dog.

The middle portion 120 and the front portion 110 of the frame may be formed to have a width gradually narrow from the middle portion to the front portion.

Since an end width of the rear portion 130 of the frame 100 may be formed to have a sufficient width so as to allow the head of the pet dog to be fit, the middle portion 120 and the front portion 110 of the frame may maintain a predetermined interval without touching the snout, which is much narrower and sharper, compared to the head of the pet dog. In other words, according to the present invention, the front portion 110 and the middle portion 120 except for the rear portion 130 of the frame 100 may be prevented from touching any part of the pet dog.

The upper portion of the frame 100 is formed as an opened surface, through a hollow 101, which does not surround the upper jaw portion of the pet dog, and the lower portion of the frame 100 is formed as a closed surface, through the screener 300, which surrounds the lower jaw portion of the pet dog.

Compared to the conventional pet dog muzzle configured to cover both the upper and lower portions of the snout of the pet dog, the upper portion of the frame 100 according to the present invention is formed as the opened surface, so that an owner may put a hand into the muzzle, stroke the head portion of the pet dog and provide feed even while the muzzle is locked, and resistance of the pet dog may be significantly reduced. In addition, the pet dog may bark freely, and may open a mouth to breathe. Due to improved air permeability, the stuffiness that the pet dog feels may be relieved.

A holding portion 210 is formed long in the middle portion 120 of the frame 100 in a front-rear direction of the frame, and the nose bridge 200 is coupled to cross the frame 100 through the holding portion 210.

As shown in FIG. 3, in one embodiment of the invention, the holding portion 210 may be formed therein with a plurality of fixing grooves 211 arranged to face each other at both sides of the middle portion 120 of the frame 100.

Pet dogs have several differences depending on the breed, and a length of the snout is the most specific difference, in which the pet dogs may be classified into short head species, middle head species, and long head species according to the length of the snout. In other words, there are various breeds having different lengths of a snout though a circumference of the snout or a circumference of a head are the same, muzzles having different sizes may be necessary according to lengths of the snout, even for dogs having the same size.

In view of the above features, the present invention the holding portion 210 is formed long in the front-rear direction of the frame 100, and a position of the nose bridge 200 is adjustable back and forth according to the length of the snout of the pet dog, so that the muzzle can be easily worn on pet dogs of different breeds having different snout lengths.

The user may determine a coupling position of the nose bridge 200, such that the front portion 110 of the frame 100 maintains a predetermined distance without touching the nose of the pet dog. The nose bridge may be positioned slightly toward eyes from a middle of the snout of the pet dog. Since the nose of the pet dog is the most sensitive part, the muzzle may be configured to avoid any contact as possible.

When the coupling position of the nose bridge 200 is determined, the user may bind and fix both ends of the nose bridge 200 to the fixing groove 211. When the muzzle is worn, the nose bridge 200 is naturally put onto the upper jaw portion (nose portion) of the pet dog due to weight of the muzzle.

The nose bridge 200 may be formed of one or more among soft or elastic silicone, nitrile butadiene, polybutadiene, styrene butadiene, ethylene propylene, and natural rubber.

Silicone is a material formed of an organic polymer compound and having excellent electrical insulation and excellent elasticity. Nitrile butadiene is a copolymer formed by low temperature emulsion polymerizing acrylonitrile and butadiene and serves as a material having excellent oil resistance. Polybutadiene is a polymer of butadiene and serves as a material having properties similar to natural rubber. Styrene butadiene is a random copolymer of styrene and butadiene, and serves as a material having excellent abrasion resistance and heat resistance. Ethylene propylene is a copolymer of ethylene and propylene without double bond, and serves as a material having excellent durability and heat resistance. Natural rubber is mainly formed of isoprene, and serves as a material having excellent elasticity, abrasion resistance and low temperature.

As shown in FIG. 5, in another embodiment of the present invention, the holding portion 210 may include a slider 212 slidable in the front-rear direction of the frame 100, and a fixture 213 rotatably mounted to the slider to fix a position of the slider.

The user may release the fixing between the slider 212 and the frame 100 by rotating the fixture 213 upwards, and the slider may be moved in the front-rear direction according to the snout length of the pet dog, so that the position of the nose bridge 200 is determined. When the position of the nose bridge is determined, the position of the slider 212 may be fixed by rotating the fixture 213 downward.

In the illustrated embodiment, the nose bridge 200 is omitted for convenience of description. However, those skilled in the art may anticipate that the nose bridge may be coupled to any side of the slider.

The screener 300 may be coupled to the lower portion of the frame 100 to surround the lower jaw portion of the pet dog. Since the snout of the pet dog is blocked from the outside by the screener 300, the pet dog cannot bite other objects outside. In addition, when the muzzle is about to slip off, the lower jaw portion of the pet dog is blocked by the screener 300, so that the muzzle is prevented from being separated.

As shown in FIG. 4, the screener 300 is formed in a streamlined shape corresponding to a shape of the lower jaw portion of the pet dog, and a vent 310 is formed at a front end of the screener 300, so that the pet dog may smell and breathe freely without getting caught by the screener at an end of the nose.

The screener 300 may be any one or a combination selected from the group including soft and transparent thermoplastic poly urethane, polyethylene terephthalate, polypropylene, and acrylonitrile butadiene-styrene (ABS) copolymer.

Thermoplastic polyurethane is a light and hard material, and has properties of not being easily dusted and not being twisted than silicone. Polyethylene terephthalate is often called PET, and is saturated polyester obtained by condensation polymerizing terephthalic acid and ethylene glycol. Polypropylene is a thermoplastic resin obtained by polymerizing propylene, and mainly used for various industrial components. ABS resin is formed of three components, that is, acrylonitrile, butadiene and styrene, and serves as a material having excellent formability and secondary processability.

The front portion 110, the holding portion 210, and the middle portion 120 of the frame 100 serve as an edge of the screener 300, and the screener 300 is formed of a material having ductile and tensile strength, thereby being prevented from being easily damaged even when the pet dog tries to bite an external object.

The frame 100 and the screener 300 may be integrally configured to ensure durability, or may be detachably configured to selectively replace the frame 100 or the screener 300 as necessary. When the frame 100 and the screener 300 are detachably configured, a conventional locking structure (not shown) may be further provided to prevent the frame 100 and the screener 300 from being easily disassembled during the coupled state.

Meanwhile, a medical diagnostic kit for diagnosing a health status of the pet dog may be selectively coupled to a lower end of the screener 300. The medical diagnostic kit may analyze saliva ingredients of the pet dog collected to the lower end of the screener to inform the health status of the pet dog in various ways such as colors (for example, a red color for a predetermined disease) or letters.

In addition, a plurality of nose bridge auxiliary holes 111 may be formed in the front portion 110 of the frame 100. It may not be easy to fix the muzzle only through the nose bridge 200 described above, in the case of a pet dog, such as Maltese, having an exceptionally short snout length.

The user fixes one end of a strap to the nose bridge auxiliary hole 111, passes the strap between both eyes of the pet dog, and fixes the other end behind the head of the pet dog, so that the function of the nose bridge may be complemented.

A communication chip may be inserted into the nose bridge auxiliary hole 111 to communicate with a user terminal such as a smartphone. The user may check a location of the pet dog or measure momentum of the pet dog by using the communication chip.

A pair of decorative holes 131 may be formed in the rear portion 130 of the frame 100 so as to face each other. The decorative holes 131 may allow various fashion items, such as a decorative headband or a birthday hat, to be hung on the head of the pet dog without an additional tool.

A length adjusting portion 132 may be formed at an end of the rear portion 130 of the frame 100. The length adjusting portion 132 is divided into both sides about a partition 133, and a fixing band 400 is inserted from one side and passes through an opposite side thereof.

The fixing band 400 is divided into a lower band 410 and an upper band 420 around the length adjusting portion 132. The user may adjust lengths of the upper band 420 and the lower band 410 to have desired lengths, respectively, by adjusting the fixing band 400 passing through the length adjusting portion 132. The lengths are fixed by a frictional force between the partition 133 and the fixing band 400 when the adjustment is completed.

The lower band 410 is disposed on a lower part of the neck of the pet dog, and the upper band 420 is disposed on a rear part of the neck of the pet dog. Accordingly, since the user may adjust one fixing band 400 based on the length adjusting portion 132, one fixing band may have the same effect as placing two bands.

Further, according to the present invention, the length adjusting portion 132 is formed integrally with the rear portion 130 of the frame 100, so that the structure can be simplified, and the length of the upper band 420 can be adjusted as needed without an additional length adjusting buckle.

A fastener 421 may be coupled to an end of the upper band 420 and fixed at a rear neck side of the pet dog, and a certain clearance may be formed between the lower band 410 and the neck of the pet dog, so that the pet dog is prevented from feeling stuffiness.

The rear portion 130 of the frame 100 is adjusted according to the size of the head of the pet dog by using a soft material, thereby coming into close contact with sides of the head of the pet dog.

In particular, specifically, the rear portion 130 of the frame 100 may be any one or a combination selected from the group including a tetoron-rayon material, polyether imide, acetate, celluloid, and titanium.

The tetoron-rayon material is a material obtained by synthesizing rayon prepared mainly using Tetoron, which is a polyester-based synthetic fiber manufactured by Tore Co., Ltd., of Japan, and natural polymer obtained from fibers, and has the advantage for mass production. Polyetherimide is a plastic material developed by GE in the United States, is commonly called ULTEM, and has excellent durability. Acetate is a semi-synthetic fiber produced from acetylcellulose, and has the advantage of softness and less moisture absorption. Celluloid is a plastic formed of nitrocellulose and generally used for a toy or the like. Titanium is a metal having high hardness and excellent flexibility, and is a material having very good properties as an industrial material.

Hereinafter, the process of wearing the pet dog muzzle according to the embodiments of the present invention will be described as follows.

Figure 6:
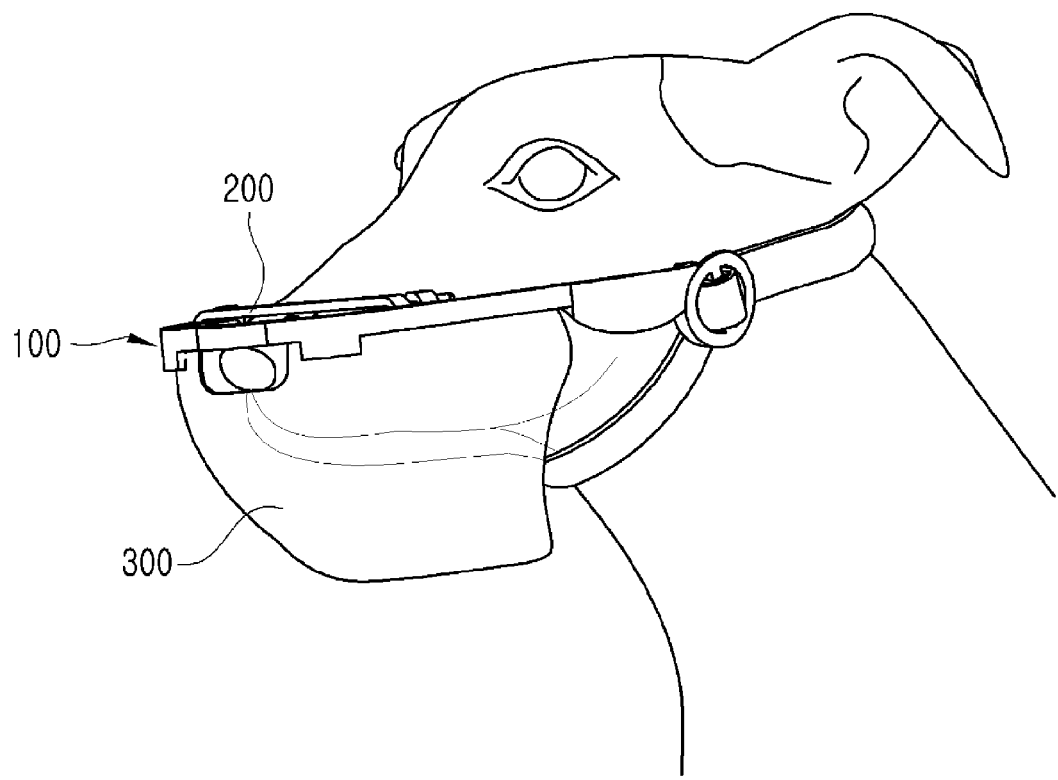
FIG. 6 is a perspective view showing a wearing state of the pet dog muzzle according to one embodiment of the present invention.

FIG. 6 is a perspective view showing a wearing state of the pet dog muzzle according to one embodiment of the present invention. Herein, the nose bridge 200 has been illustrated as being provided.

First, the user may determine a position to couple the nose bridge 200, and then fix the nose bridge 200 to the holding portion 210, such that the front portion 110 of the frame 100 maintains a predetermined distance without touching the nose of the pet dog. The nose bridge may be positioned slightly toward eyes rather than a tip side of the snout of the pet dog.

Then, after the muzzle is put on by pushing the end of the rear portion 130 of the frame 100 toward the head of the pet dog, the lower band 410 is positioned between a chin and the neck of the pet dog, and the upper band 420 is fastened through the fastener 421 while being positioned toward the rear neck of the pet dog. The lower band 410 may be spaced apart from the neck of the pet dog a predetermined distance, so that the pet dog is prevented from feeling stuffiness.

When wearing is complete, the pet dog may have enough space to open a mouth or eat feed since parts other than the nose bridge 200 are prevented from touching the snout. In addition. Since the upper portion of the frame 100 is opened type, the pet dog may have enough connection with the owner even when wearing the muzzle.

The screener 300 serves to prevent the dog from biting other people, and a vent 310 is formed at a front end of the screener 300, so that the pet dog may smell enough without being caught by the screener during walking.

The muzzle according to the present invention is naturally hung on the nose bridge 200 due to weight of the muzzle when the pet dog walks or runs lightly. In addition, the rear portion 130 of the frame 100 is formed of an elastic material to surround a side head of the pet dog, and the lower band 410 and the upper band 420 improve the rigidity upon wearing.

When the pet dog tries to remove the muzzle, the screener 300 blocks in a lower direction thereby preventing the separation, the nose bridge 200 prevents the separation in an upper direction, and the fixing band 400 also prevents the separation forward or rearward.

Meanwhile, the periphery or edge of the vent 310 formed in the screener 300 or the frame 100 may be formed to be relatively thick compared to the thickness of other areas and processed to be rounded, so that a skin including a tongue or nose of the pet dog is prevented from being injured even when coming into contact with the periphery or edge.

Figure 7:
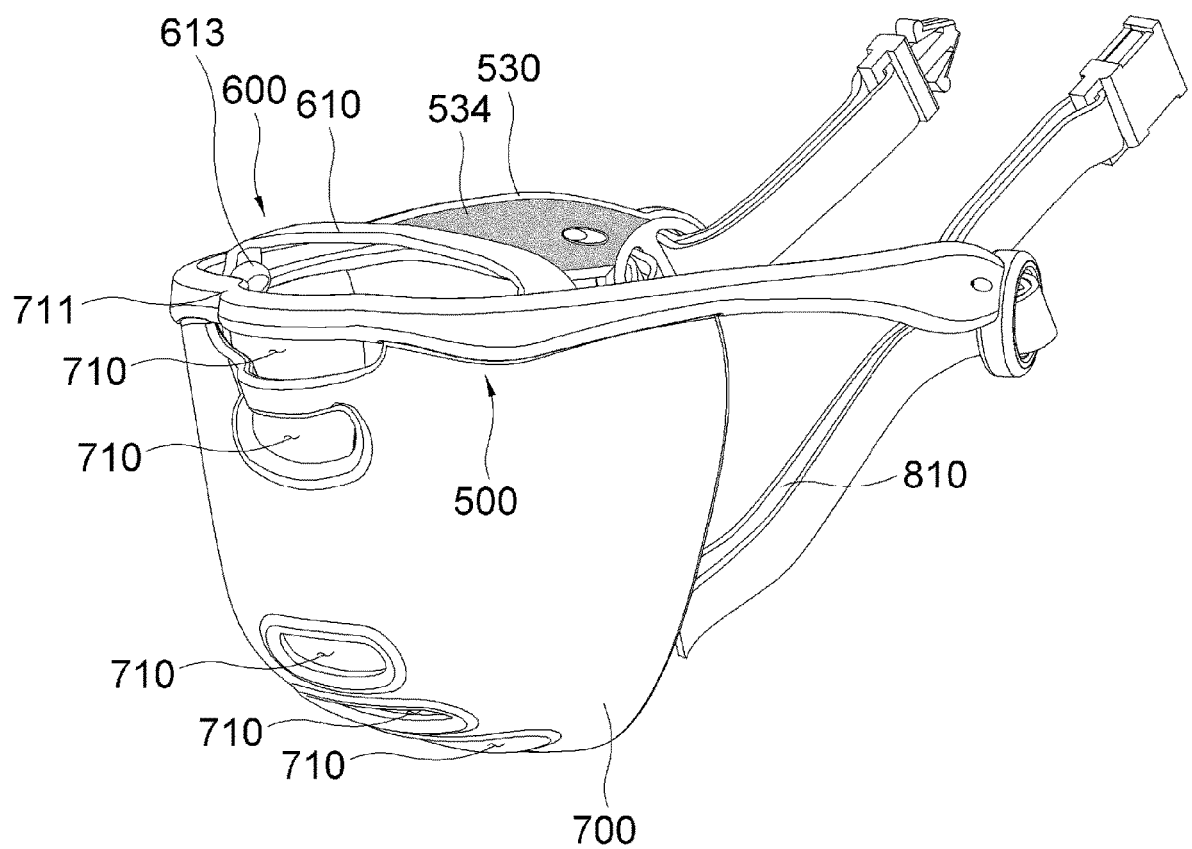
FIG. 7 is a perspective view showing a pet dog muzzle according to another embodiment of the present invention.
Figure 8:
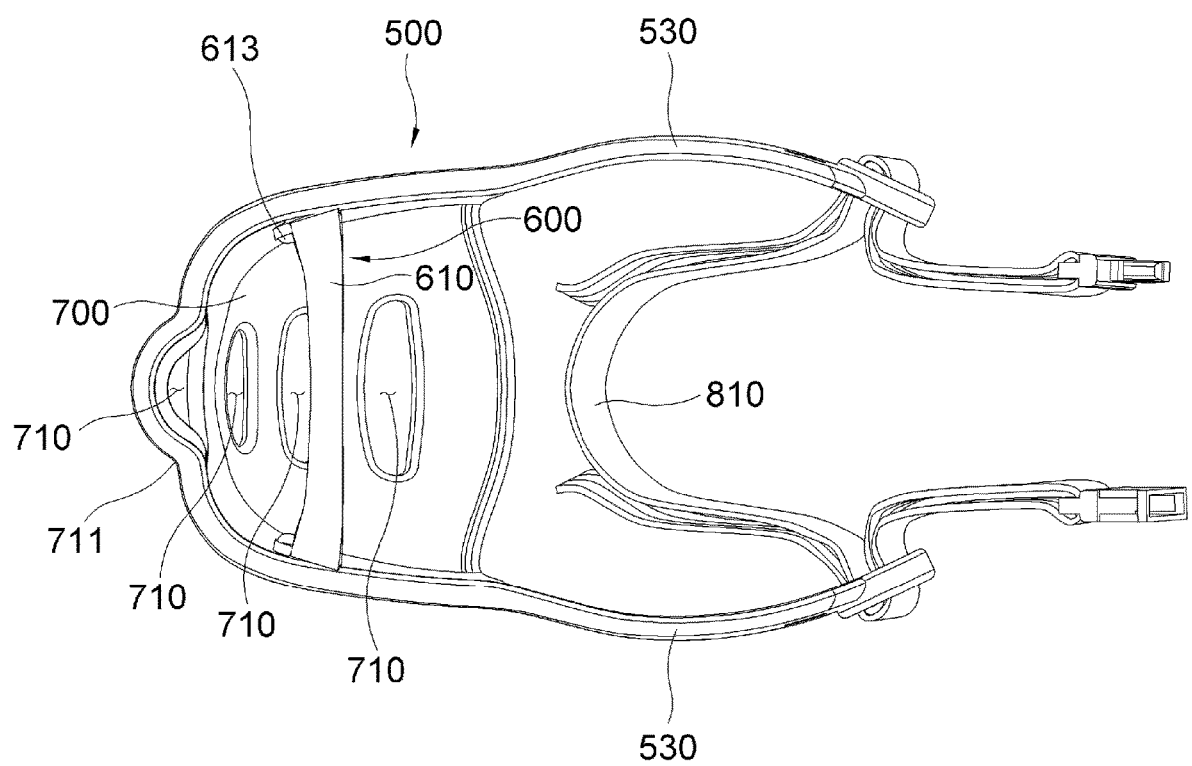
FIG. 8 is a plan view showing the pet dog muzzle according to another embodiment of the present invention.
Figure 9:
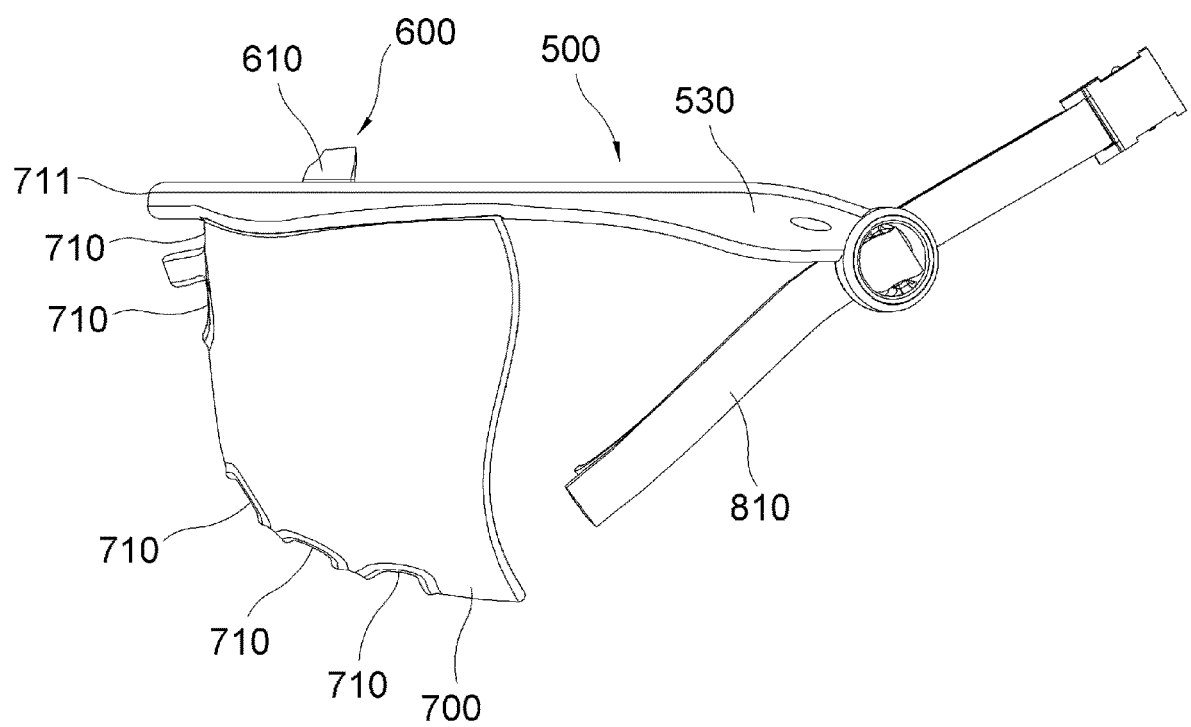
FIG. 9 is a side view showing the pet dog muzzle according to another embodiment of the present invention.

FIG. 7 is a perspective view showing a pet dog muzzle according to another embodiment of the present invention. FIG. 8 is a plan view showing the pet dog muzzle according to another embodiment of the present invention. FIG. 9 is a side view showing a holding portion according to another embodiment of the present invention.

As shown in FIG. 7, a buffer 534 is additionally provided on an inner side of the rear portion 530 by using a rubber material, such as elastomer, a fiber material, or a sponge, so that the skin of the pet dog is protected and the pressure due to long-term wearing is buffered.

Elastomer is an elastic plastic material, and is highly value-added synthetic resin having both the advantages of rubber that extends when applied by force and plastic that is easily processed.

The buffer 534 may be formed by various schemes such as double injection and attachment, and the above formation schemes are not limited to a specific scheme. In addition, any material may be used as long as it is a material capable of buffering the pressure in addition to the rubber material, fiber material, and sponge as described above.

Accordingly, the pet dog muzzle may further improve wearing stability.

According to another embodiment of the present invention shown as FIGS. 7 to 9, the holding portion 613 of the present invention may have a shape of a protrusion on one side of the inner surface of the frame 500.

The nose bridge 600 mounted to the holding portion 613 according to another embodiment as described above may be described as being divided into a mounting portion 610 and both ends 611, in which the mounting portion 610 extends between both ends 611, and the both ends are formed therein with perforated holes 612 to be fixed to the holding portion by male-female coupling.

In this case, an additional fixing groove 211 is not required in the holding portion 613. In other words, according to one embodiment of the present invention, the nose bridge 200 may be coupled to the fixing groove 211 formed long along the frame 100 so as to move back and forth. However, according to another embodiment of the present invention, the nose bridge 600 may be inverted upside down and mounted to the holding portion 613, so that the nose bridge 600 may be used flexibly according to the breed.

This is shown in FIG. 9. As shown in the drawings, when the nose bridge 600 is mounted such that the mounting portion 610 is disposed in front of the both ends 611, it is suitable for breeds having a relatively long snout. When the nose bridge 600 is mounted such that the mounting portion 610 is disposed in rear of the both ends 611, it is suitable for breeds having a relatively short snout. Thus, a single nose bridge 600 and a single muzzle can be used in response to various breeds.

Figure 10:
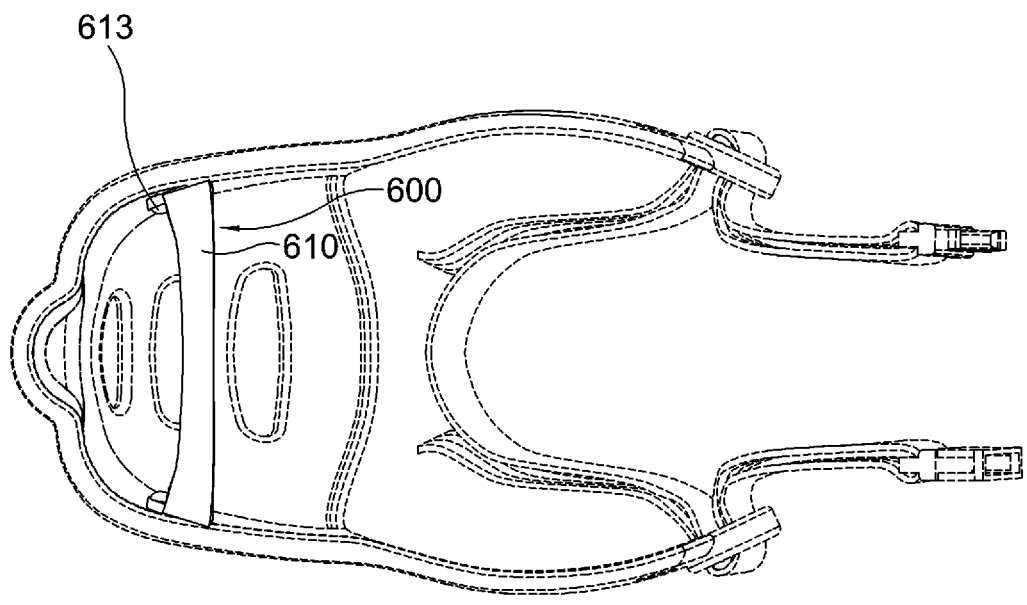
FIG. 10 is a plan view showing examples according to directions of a mounting portion of a nose bridge in the pet dog muzzle according to another embodiment of the present invention.
Figure 10:
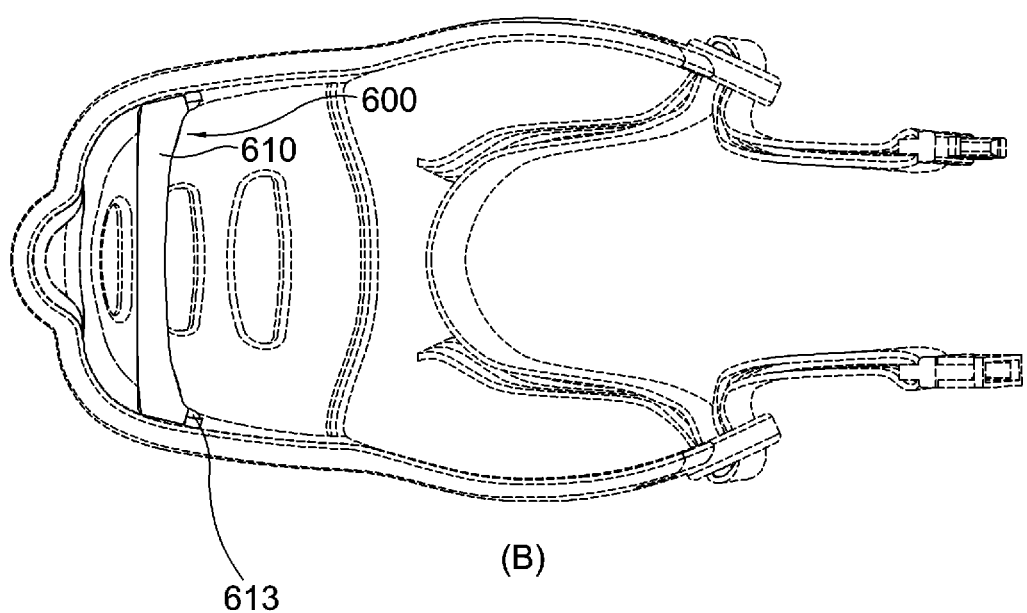

FIG. 10 shows plan views for the case in which the mounting portion 610 is disposed forward than the both ends 611, and the case in which the mounting portion 610 is disposed rearward than the both ends 611. Accordingly, since the nose bridge 600 may be used by inversing the relation between the mounting portion 610 and the both ends 611, various breeds can be applied.

In addition, according to the present invention, in the front portion of the frame 500, an area adjacent to the nose of the pet dog may protrude outward. A protruding point is indicated by reference numeral 711. Accordingly, the pet dog is taken into consideration as possible to prevent the sensitive nose of the pet dog from being interfered by the frame 500.

Further, a vent 710 may be further formed in the screener 700 of the present invention to prevent saliva of the pet dog from being pooled therein, enable the pet dog to breathe smoothly, allow the pet dog to be fed with water or food. Accordingly, the pet dog may be taken into consideration to avoid the stress.

In addition, the screener 700 of the present invention may be formed of a transparent member, so that it is easy to monitor a current situation such as a psychological state of the pet dog, and a respond may be pro-actively performed according to the state of the pet dog.

For other configurations related to FIGS. 7 to 10, the descriptions of FIGS. 2 to 6 may be referred to. Therefore, detailed descriptions will be omitted with reference to the above descriptions of FIGS. 2 to 6.

Figure 11:
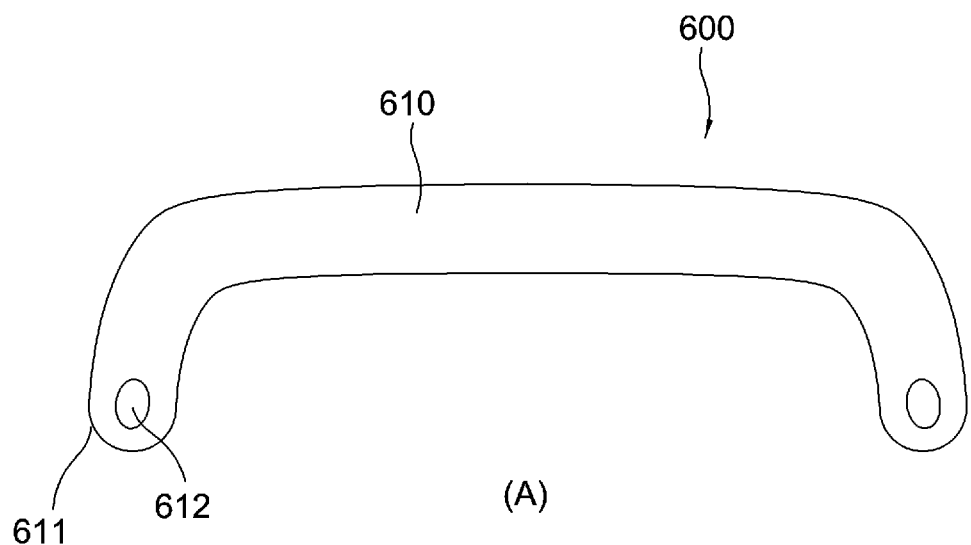
FIG. 11 is a plan view showing examples according to shapes of the mounting portion of the nose bridge in the pet dog muzzle according to another embodiment of the present invention.
Figure 11:
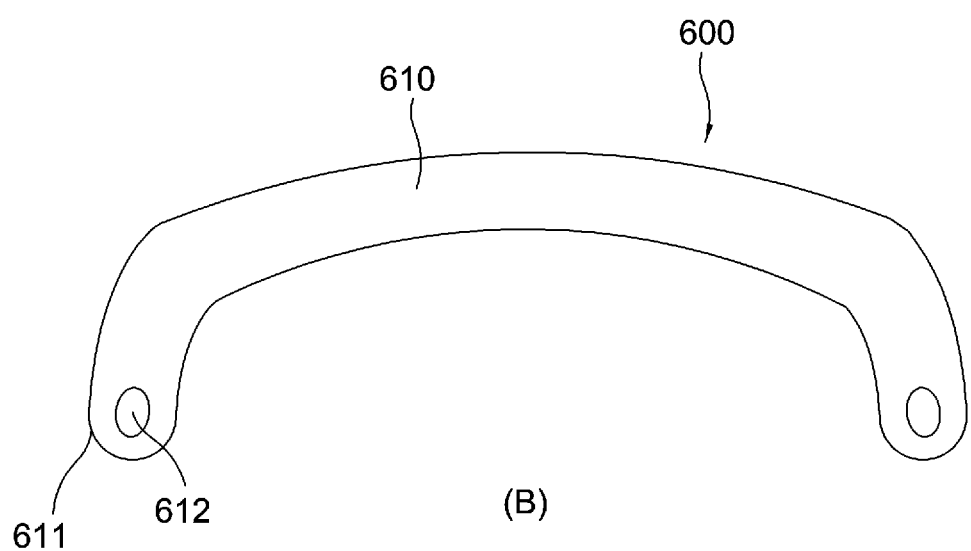

FIG. 11 shows the mounting portion 610 in two forms, in which the mounting portion 610 may extend to form a curved shape between the both ends 611, or may extend to include a straight shape between the both ends 611. An imaginary line A connecting predetermined two points of the perforation holes 612 formed in the both ends 611 may be configured to be inconsistent with the mounting portion 610 including the curved or straight shape. This corresponds to a scheme for utilizing the nose bridge 600 as replaceable according to the breed as shown in FIG. 10.

When the breed is not taken into consideration, the imaginary line connecting the predetermined two points included in the both ends 611 may be configured to match the mounting portion 610.

It shall be apparent to those skilled in the art that the present invention is not limited to the described embodiments and accompanying drawings, and various replacements, deformations and modifications are available without departing from the spirit or scope of the invention as defined in the appended claims.

The invention claimed is:

1. A pet dog muzzle comprising:
a frame disposed between an upper jaw portion and a lower jaw portion of a pet dog;
a screener coupled to a lower portion of the frame to surround the lower jaw portion of the pet dog;
a fixing band coupled to a rear portion of the frame, wherein an upper portion of the upper jaw portion maintains an opened state, thereby ensuring a vision of the pet dog and reducing resistance; and
a nose bridge coupled to cross the frame through a holding portion formed in a middle portion of the frame,
wherein the holding portion has a shape of a protrusion on one side of an inner surface of the frame,
wherein the nose bridge includes a mounting portion extending between both ends of the nose bridge, and the both ends are formed therein with perforated holes to be fixed to the holding portion by male-female coupling,
wherein the mounting portion extends to include a straight shape between the both ends, and an imaginary line connecting the perforated holes formed at the both ends is inconsistent with the mounting portion including the straight shape.

2. The pet dog muzzle of claim 1, wherein the upper portion of the frame may be formed as an opened surface through a hollow so that the upper jaw portion of the pet dog is not surrounded, and the lower portion of the frame is formed as a closed surface that surrounds the lower jaw portion of the pet dog by using the screener.

3. The pet dog muzzle of claim 1, wherein the holding portion is formed long in a front-rear direction of the frame so that the nose bridge is coupled to a predetermined position in the front-rear direction.

4. The pet dog muzzle of claim 3, wherein the holding portion includes:
a slider slidable in the front-rear direction of the frame; and
a fixture rotatably mounted to the slider to fix a position of the slider.

5. The pet dog muzzle of claim 1, wherein the holding portion is formed therein with a plurality of fixing grooves arranged to face each other at both sides of the middle portion of the frame.

6. The pet dog muzzle of claim 1, wherein the mounting portion extends to form a curved shape between the both ends.

7. The pet dog muzzle of claim 1, wherein an area of a front portion of the frame which is adjacent to a nose of the pet dog protrudes outward in the frame.

8. The pet dog muzzle of claim 1, wherein a plurality of nose bridge auxiliary holes are formed in a front portion of the frame.

9. The pet dog muzzle of claim 1, wherein a pair of decorative holes are formed in the rear portion of the frame to face each other.

10. The pet dog muzzle of claim 1, wherein the rear portion of the frame is formed at an end thereof with a length adjusting portion, such that a fixing band is inserted from one side and passes through an opposite side around a partition; the fixing band is divided into a lower band disposed on a lower part of a neck of the pet dog and an upper band disposed on a rear part of the neck of the pet dog around the length adjusting portion; and the lower band and the upper band are fixed at predetermined lengths by the length adjusting portion.

11. The pet dog muzzle of claim 1, wherein a buffer formed of a rubber containing elastomer or a fiber is further provided at an inner part in the rear portion of the frame to come into contact with a body of the pet dog.

12. The pet dog muzzle of claim 1, wherein the screener is formed therein with a vent, and a periphery or edge of the vent or the frame is formed to be relatively thick compared to thicknesses of other areas and processed to be rounded, so that a skin including a tongue or nose of the pet dog is prevented from being injured even when coming into contact with the periphery or edge.

13. The pet dog muzzle of claim 1, wherein the frame and the screener are detachably coupled to each other.

14. A pet dog muzzle comprising:
- a frame disposed between an upper jaw portion and a lower jaw portion of a pet dog;
- a screener coupled to a lower portion of the frame to surround the lower jaw portion of the pet dog;
- a fixing band coupled to a rear portion of the frame, wherein an upper portion of the upper jaw portion maintains an opened state, thereby ensuring a vision of the pet dog and reducing resistance; and
- a nose bridge coupled to cross the frame through a holding portion formed in a middle portion of the frame,
- wherein the holding portion is formed long in a front-rear direction of the frame so that the nose bridge is coupled to a predetermined position in the front-rear direction,
- wherein the holding portion includes:
  - a slider slidable in the front-rear direction of the frame; and
  - a fixture rotatably mounted to the slider to fix a position of the slider.

\* \* \* \* \*